UNITED STATES PATENT OFFICE.

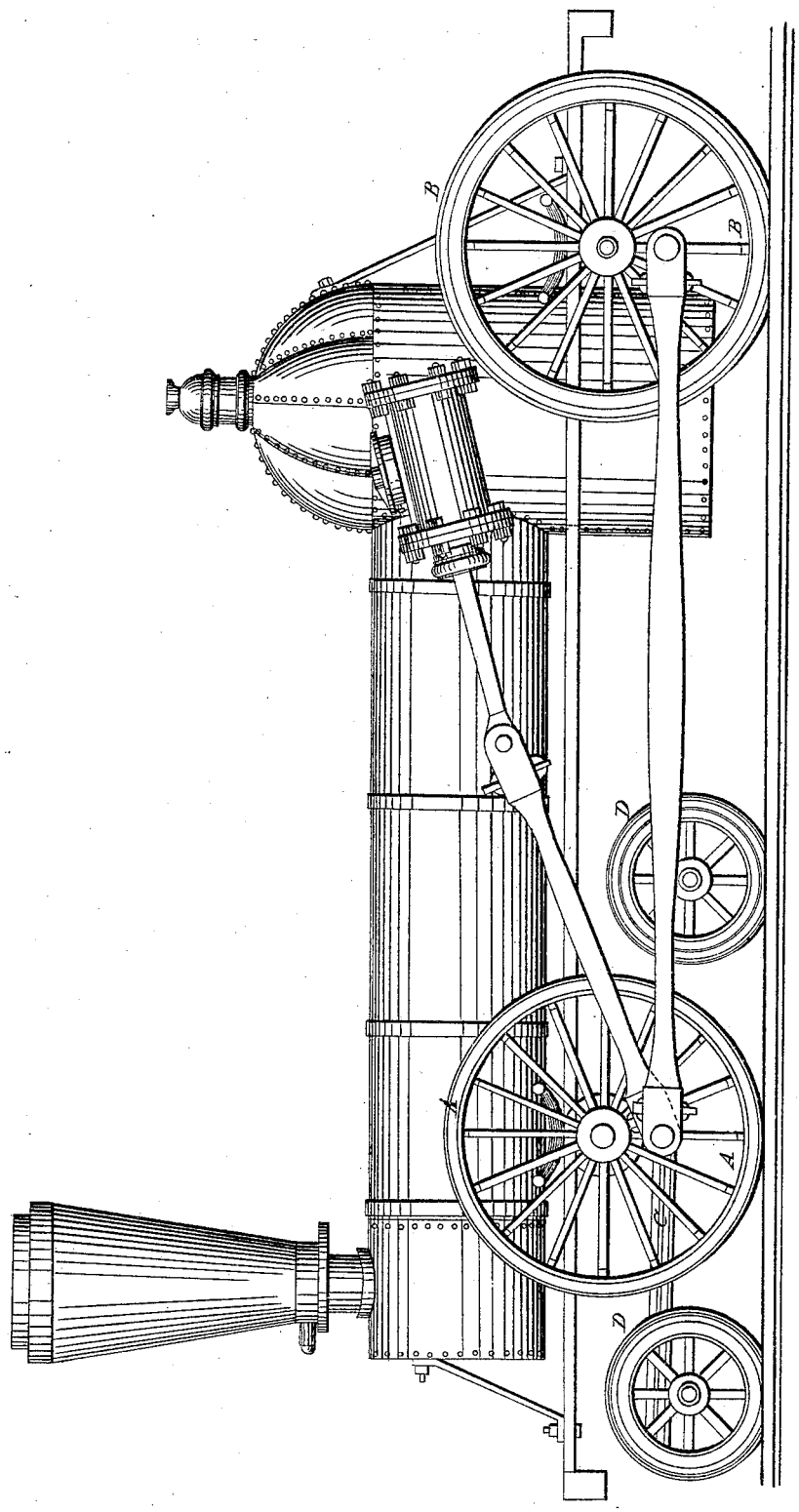

JAS. H. MURRILL, OF MANCHESTER, VIRGINIA.

RUNNING-GEAR OF LOCOMOTIVES.

Specification of Letters Patent No. 8,410, dated October 7, 1851.

*To all whom it may concern:*

Be it known that I, JAMES H. MURRILL, of Manchester, in the county of Chesterfield and State of Virginia, have invented a new and useful Improvement in Locomotive-Engines, being a New Arrangement of Driving-Wheels for Increasing the Traction of the Engine; and I do hereby declare the following to be a full and clear description of the same, reference being had to the annexed drawings, making part of this specification.

Figure 1, is an elevation of a locomotive engine, showing the arrangement of the driving wheels, and guiding truck.

The nature of my improvement consists in arranging a pair of large unflanged driving wheels A, at the frontward end of the locomotive between the ordinary flanged truck wheels D, D, in such a manner as to support the frontward portion of the locomotive engine, heretofore supported by the truck wheels. This feature of combining a pair of unflanged driving wheels A in connection with the rear flanged driving wheels B, for sustaining the entire weight of the locomotive engine in connection with an ordinary truck frame C and wheels D confined by a center bolt for the purpose of guiding the locomotive on the track, takes from the truck wheels D the weight of the locomotive engine usually sustained thereon and brings it entirely upon the driving wheels A, B, thus increasing the adhesion of the driving wheels to the rail.

The truck frame C is secured by a center bolt in any convenient manner directly beneath the axles of the unflanged driving wheels so as to allow it to turn in passing over curves in the track, the flanged truck wheel being arranged on either side of the unflanged driving wheel A. This arrangement guards the truck frame and prevents its flanged wheels from riding the rails, or from being suddenly thrown therefrom, as the truck frame is so situated and connected with the locomotive as to prevent its rising sufficient to ride the rail or leave it without displacing the body of the engine with its full weight which is rendered almost impossible. By thus arranging the driving wheels A, B, so as to support the whole weight of the locomotive engine, the traction of the driving wheels of a ten ton engine is made equal to those of an engine of 15 tons now in use, so that the engine is made to draw much heavier loads over steep ascending grades.

What I claim as my invention and desire to secure by Letters Patent, is—

The manner of employing the unflanged driving wheels A connected and arranged as described with the flanged truck wheels D, at the forward end of the engine in combination with the flanged driving wheels B for the purpose of increasing the traction or adhesion of the driving wheels to the rails for overcoming steep grades without increasing the weight of the engine.

In testimony whereof I have hereunto signed my name before two subscribing witnesses.

JAMES H. MURRILL.

Witnesses:
  WM. P. ELLIOT,
  L. S. SMITH.